G. F. WILSON.
Wheel Hub.

No. 84,329. Patented Nov. 24, 1868.

WITNESSES.

George F. Wilson

GEORGE F. WILSON, OF EAST PROVIDENCE, RHODE ISLAND.

Letters Patent No. 84,329, dated November 24, 1868.

IMPROVEMENT IN THE METHOD OF INSERTING INDIA RUBBER IN HUBS OF CARRIAGES.

The Schedule referred to in these Letters Patent and making part of the same.

*To all whom it may concern:*

Be it known that I, GEORGE F. WILSON, of East Providence, in the county of Providence, and the State of Rhode Island, have invented a new and useful Improvement in the Method of Inserting India Rubber or other Elastic Substances in the Hubs of Carriage-Wheels; and I do hereby declare that the following is a full and exact description thereof, reference being had to the accompanying drawings, and to the letters of reference marked thereon.

The object of my invention is to secure the benefit of the elastic properties of India rubber, and other substances of similar character, when the same is inserted between the box and the hub of a carriage-wheel, substantially as shown, without danger or liability of splitting the hub when in use.

The nature of my invention consists in the insertion of a metallic lining firmly into the hub, which has been previously properly chambered out, or prepared to receive the India rubber or other elastic body, so that the rubber shall be held between the metallic lining and the box of the hub or wheel.

On the 30th of March, 1858, a patent was granted to James M. Whiting, and by him assigned to himself, Alfred Anthony, and myself, for an invention for the insertion of the India rubber into the hubs of carriage-wheels. I found, on putting the invention into practical use, that unless the wooden hub were made of unusually large size, so much of the wood was removed in chambering out the hub to receive the rubber or other elastic body, that the hub was rendered too weak for hard usage, and that it was even liable to the danger of splitting by the compression of the nut and screw, provided in the patent of said Whiting, for the purpose of keeping the rubber in its place under suitable strain.

To obviate this difficulty, I have invented the metallic lining, which will now be described; and I shall describe not only the lining, but also the method of uniting or combining it with the hub, together with the box, the rubber, and the nuts, and other parts of the mechanism, so that any one skilled in the art may make and use my invention.

In the accompanying drawings—

Figure 2:
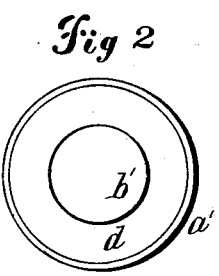
Figure 2 is a side elevation of the metallic lining.
Figure 3:
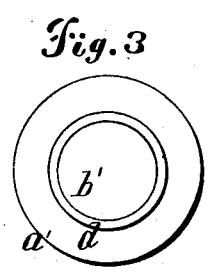
Figure 3 is a plan view of the lining, looking from the end, $b'$.
Figure 4:
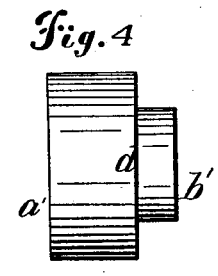
Figure 4 is a like view of the end, $a'$.
Figure 1:
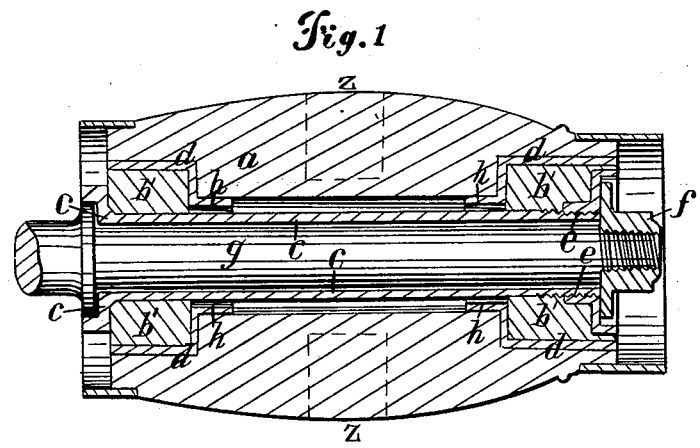
Figure 1 is a longitudinal central section through a hub, made in accordance with my invention.

$g$ is the axle, and, $f$ the nut which holds the wheel thereon.

$a$ is the body of the hub.

$z\ z$, the mortises for the spokes.

$c\ c$ the box, and, $e\ e$, the nut screwed on it.

$d\ d$ are the metallic-lining tubes, fitting into the hub, as shown at each end, and $b\ b$ are India-rubber cylinders, inserted in the said tubes, at each end of the hub.

$h\ h$ are spaces, between the tubes $d$ and the box $c$, to admit of the vibration in the rubber caused by concussions.

The wheel is made and tired in the usual manner. It is then fastened by the rim to the face-plate of a lathe, and a hole is bored through the hub, perpendicular to the plate, larger than the box $c$, and large enough to receive the small ends of the metallic-lining tubes $d$. Without removing the wheel from the plate, seats for the larger ends of the lining-tubes are chambered out; the wheel is put into position, and the tubes pressed into their places. The cylinder of rubber, $b$, at the large end of the hub, is then inserted, and the box $c$ put through it. The rubber at the small end of the hub is then driven or pressed into its tube, $d$, and the nut $e$ screwed into its place by means of an "eight-square" wrench, taking hold of the inside of the nut.

The wheel is now ready for use. As the nuts holding the wheels on their axles are "right and left-handed," so are the nuts on the boxes which pack the rubber into place, but as the "right-hand nut" on the axle must be on the right-hand side of the wagon, the "left-hand nut" on the box must be on the right-hand side of the wagon also, so that the motion of the wheels in use will tend to keep the nuts $e\ e$ constantly screwed tight. Should the box ever work loose, a few turns of the nut $e$, with the insertion of a leather washer, if needed, will put it in place again.

I have made the metallic lining of brass, bronze, malleable and cast-iron, but I prefer, for light carriages, cast brass or malleable iron, and for heavy carriages, malleable iron or gun-metal, so called by the iron-founders.

I have made the metallic lining of two tubes of different diameters, one end of the greater being connected with one end of the smaller by means of a ring or washer, as shown, the whole being, in practice, one piece of metal or casting.

I have found that in case the rubber were inserted, as contemplated in the said patent of Whiting, without any lining for the hub, that the hub was liable to be split or shelled off, so to speak, from the circumference of the chamber, and in line with it, toward the spokes of the wheel, and, without doubt, by the operation, in a jarring manner, of two forces in opposite directions, the one, the weight of the carriage and load resting by means of the box and rubber on each end of the hub, and crowding downwards; the other, the weight of the whole load and carriage resting through and by means of the spokes on the centre of the hub, and crowding upwards. This difficulty did not seem to be obviated by the insertion of tubes of different diameters, the smaller one being under or nearly under the centre of the bearing of the spokes, and the others lining the chamber cut out at each end of the hub to receive the rubber, but was entirely obviated when constructed in the manner indicated by the drawing, where it will be seen that each tube is so formed that its larger end will line both the sides and end of the chamber to which it is applied, while its smaller end extends back a greater or less distance, as may be desired, into the interior of the hub.

What I claim as my invention, and desire to secure by Letters Patent, is—

1. The employment, in the hubs of carriage-wheels, such as described, of a metallic lining, interposed between the India rubber or other elastic substance, and that portion of the hub in which said elastic substance is held, substantially as and for the purposes set forth.

2. The combination, with the rubber or other elastic bearing and chambered hub, of a metallic lining, constructed as herein specified, so that while its larger end will line the sides and end of the chamber in which the rubber is held, its smaller end will extend back more or less into the interior of the hub, as and for the purposes set forth.

GEO. F. WILSON.

Witnesses:
JAMES TILLINGHAST,
N. D. ARNOLD.